(12) United States Patent
Wrigley et al.

(10) Patent No.: US 6,458,895 B1
(45) Date of Patent: *Oct. 1, 2002

(54) LOW COMPRESSION, RESILIENT GOLF BALLS INCLUDING ELEMENTAL CATALYST AND METHOD FOR MAKING SAME

(75) Inventors: Mark N. Wrigley, New Bedford; David A. Bulpett, Boston; Jeffrey L. Dalton, North Dartmouth; Derek Ladd, New Bedford, all of MA (US); Steven M. Gosetti, Providence, RI (US); Murali Rajagopalan, South Dartmouth, MA (US); Laurent C. Bissonnette, Portsmouth, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,421

(22) Filed: Dec. 16, 1999

Related U.S. Application Data

(60) Provisional application No. 60/113,949, filed on Dec. 24, 1998.

(51) Int. Cl.⁷ .......................... A63B 37/02; A63B 37/06; C08L 9/00
(52) U.S. Cl. .................. 525/248; 525/264; 525/274; 525/332.5; 525/332.6; 473/354; 473/357; 473/371; 473/372; 473/373; 473/374; 473/377
(58) Field of Search .................. 525/264, 274, 525/332.5, 248, 332.6; 473/354, 357, 371, 372, 373, 374, 377

(56) References Cited

U.S. PATENT DOCUMENTS

| | | | |
|---|---|---|---|
| 3,239,228 A | 3/1966 | Crompton, III | 273/218 |
| 3,572,721 A | 3/1971 | Harrison et al. | 372/218 |
| 3,572,722 A | 3/1971 | Harrison et al. | 273/218 |
| 3,666,272 A | 5/1972 | Walker et al. | 273/218 |
| 3,804,421 A | 4/1974 | Alex et al. | 273/218 |
| 3,926,933 A | 12/1975 | Naylor | 260/94.3 |
| 3,965,055 A | 6/1976 | Shichman et al. | 260/3 |
| 3,992,014 A | 11/1976 | Retford | 273/218 |
| 4,033,900 A | 7/1977 | Hargis et al. | 252/431 L |
| 4,144,223 A | 3/1979 | Kent | 260/42.47 |
| 4,310,582 A | 1/1982 | Stumpe, Jr. | 428/182 |
| 4,611,810 A * | 9/1986 | Kamata | |
| 4,650,193 A | 3/1987 | Molitor et al. | 273/228 |
| 4,674,751 A | 6/1987 | Molitor et al. | |
| 4,692,497 A | 9/1987 | Gendreau et al. | 525/263 |
| 4,848,770 A | 7/1989 | Shama | 273/228 |
| 4,852,884 A * | 8/1989 | Sullivan | |
| 4,931,376 A | 6/1990 | Ikematsu et al. | 526/164 |
| 4,971,329 A | 11/1990 | Llort et al. | 273/218 |
| 4,984,803 A | 1/1991 | Llort et al. | 273/235 R |
| 5,017,636 A | 5/1991 | Hattori et al. | 524/300 |
| 5,025,059 A | 6/1991 | Mouri et al. | 524/495 |
| 5,037,104 A | 8/1991 | Watanabe et al. | 273/35 R |
| 5,131,662 A | 7/1992 | Pollitt | 273/230 |
| 5,141,233 A | 8/1992 | Yuki et al. | 273/218 |
| 5,150,905 A | 9/1992 | Yuki et al. | 273/218 |
| 5,184,828 A | 2/1993 | Kim et al. | 273/228 |
| 5,252,652 A | 10/1993 | Egashira et al. | 524/392 |
| 5,421,580 A | 6/1995 | Sugimoto et al. | 273/227 |
| 5,482,287 A * | 1/1996 | Nesbitt | |
| 5,494,958 A | 2/1996 | Freeman et al. | 524/505 |
| 5,553,852 A | 9/1996 | Higuchi et al. | 473/373 |
| 5,574,107 A | 11/1996 | Hiraoka et al. | 525/193 |
| 5,585,440 A | 12/1996 | Yamada et al. | 525/193 |
| 5,587,420 A | 12/1996 | Takizawa et al. | 524/572 |
| 5,589,546 A | 12/1996 | Hiraoka et al. | 525/193 |
| 5,609,532 A * | 3/1997 | Chikaraishi | |
| 5,697,856 A | 12/1997 | Moriyama et al. | 473/374 |
| 5,704,852 A | 1/1998 | Kato et al. | 473/357 |
| 5,716,293 A | 2/1998 | Yabuki et al. | 473/363 |
| 5,728,011 A | 3/1998 | Sugimoto et al. | 473/357 |
| 5,779,561 A | 7/1998 | Sullivan et al. | 473/373 |

(List continued on next page.)

FOREIGN PATENT DOCUMENTS

| | | |
|---|---|---|
| AU | A-16547/97 | 2/1997 |
| AU | A-16548/97 | 2/1997 |
| EP | 0 577 058 A1 | 1/1994 |
| EP | 0 903 357 A1 | 3/1999 |
| GB | 1168609 | 10/1969 |
| GB | 1209032 | 10/1970 |
| GB | 2231021 | 7/1998 |
| JP | 60-249979 * | 12/1985 |

OTHER PUBLICATIONS

Grant & Hackh's Chemical Dictionary p. 209, Feb. 1990.*

*Primary Examiner*—David J. Buttner
(74) *Attorney, Agent, or Firm*—Swidler Berlin Shereff Friedman, LLP

(57) ABSTRACT

A low compression, resilient golf ball having a center and a cover, made from a polybutadiene reaction product having polybutadiene, a cis-to-trans catalyst including a Group VIA element, such as at least one of sulfur, polymeric sulfur, selenium, or tellurium, and a free radical source. The reaction product typically has a first dynamic stiffness measured at −50° C. that is less than about 130 percent of a second dynamic stiffness measured at 0° C. A multi-layer golf ball having a center, at least one intermediate layer disposed concentrically about the center, and a cover. At least a portion of at least one of the center, intermediate layer, or both, are made from a reaction product including polybutadiene having a cis-to-trans catalyst that includes at least one elemental sulfur, polymeric sulfur, selenium, or tellurium component and a free radical source. In particular, the use of various combinations of polybutadiene, cis-to-trans catalyst including at least one elemental component, free radical source, filler, and crosslinker, produces golf balls and golf ball components that are resilient (fast) and have low compression (soft).

56 Claims, 1 Drawing Sheet

U.S. PATENT DOCUMENTS

| | | | |
|---|---|---|---|
| 5,803,831 A | 9/1998 | Sullivan et al. | 473/374 |
| 5,816,944 A | 10/1998 | Asakura et al. | 473/372 |
| 5,833,553 A | 11/1998 | Sullivan et al. | 473/374 |
| 5,840,801 A | 11/1998 | Gardiner | 525/54.44 |
| 5,861,465 A | 1/1999 | Hamada et al. | 525/332.6 |
| 5,919,101 A | 7/1999 | Yokota et al. | 473/374 |
| 5,929,171 A | 7/1999 | Sano et al. | 525/261 |
| 6,012,997 A | 1/2000 | Mason | 473/594 |
| 6,130,295 A | 10/2000 | Yokota | 525/221 |
| 6,162,135 A * | 12/2000 | Bulpett | |

* cited by examiner

LOW COMPRESSION, RESILIENT GOLF BALLS INCLUDING ELEMENTAL CATALYST AND METHOD FOR MAKING SAME

CROSS-REFERENCE TO RELATED APPLICATIONS

This application is a continuation-in-part of co-pending application Ser. No. 60/113,949, filed Dec. 24, 1998, now pending.

FIELD OF THE INVENTION

The present invention relates to low compression, resilient golf balls and portions thereof formed from the conversion reaction of an amount of polybutadiene, a free radical source, and a cis-to-trans catalyst including at least one sulfur component, selenium component, or tellurium component, at a sufficient reaction temperature to form a polybutadiene reaction product.

BACKGROUND OF THE INVENTION

Conventional golf balls can be divided into several general classes: (a) solid golf balls having one or more layers, and (b) wound golf balls. Solid golf balls include one-piece balls, which are easy to construct and relatively inexpensive, but have poor playing characteristics and are thus generally limited for use as range balls. Two-piece balls are constructed with a generally solid core and a cover and are generally the most popular with recreational golfers because they are very durable and provide maximum distance. Balls having a two-piece construction are commonly formed of a polymeric core encased by a cover. Typically, the core is formed from polybutadiene that is chemically crosslinked with zinc diacrylate and/or other similar crosslinking agents. These balls are generally easy to manufacture, but are regarded as having limited playing characteristics. Solid golf balls also include multi-layer golf balls that are comprised of a solid core of one or more layers and/or a cover of one or more layers. These balls are regarded as having an extended range of playing characteristics.

Wound golf balls are generally preferred by many players due to their high spin and soft "feel" characteristics. Wound golf balls typically include a solid, hollow, or fluid-filled center, surrounded by a tensioned elastomeric material and a cover. Wound balls generally are more difficult and expensive to manufacture than solid two-piece balls.

A variety of golf balls designed to provide a wide range of playing characteristics, i.e., the compression, velocity, "feel," and spin, that can be optimized for various playing ability, are known in the prior art. One of the most common polymer components present in modern golf ball construction, in addition to ionomers, is polybutadiene and, more specifically, polybutadiene having a high cis- isomer concentration. The use of a polybutadiene having a high cis-concentration results in a very resilient and rigid golf ball, especially when coupled with a hard cover material. These highly resilient golf balls have a relatively hard "feel" when struck by a club. Soft "feel" golf balls constructed with a high cis-polybutadiene have low resilience. In an effort to provide improved golf balls, various other polybutadiene formulations have been prepared, as discussed below.

U.S. Pat. No. 3,239,228 discloses a solid golf ball having a core molded of polybutadiene rubber with a high sulfur content, and a cover. The polybutadiene content of the core is stereo-controlled to the configuration 25–100 percent cis- and 0–65 percent trans-1,4-polybutadiene, with any remainder having a vinyl configuration of polybutadiene. A preferred embodiment of the polybutadiene golf ball core contains 35 percent cis-, 52 percent trans-, and 13 percent vinyl-polybutadiene. The level of trans- and vinyl- content are disclosed to be unimportant to the overall playing characteristics of the polymer blend.

British Patent No. 1,168,609 discloses a molding composition from which improved golf ball cores can be molded and which contains cis-polybutadiene as a basic polymer component. The core polymer component typically includes at least 60 percent cis-polybutadiene, with the remainder being either the trans- or vinyl- forms of polybutadiene. In a preferred embodiment, the core polybutadiene component contains 90 percent cis- configuration, with the remaining 10 percent being either the trans- or vinyl- configurations of 1,4-polybutadiene.

U.S. Pat. Nos. 3,572,721 and 3,572,722 disclose a solid, one- or two-piece golf ball, with the two-piece ball having a core and a cover. The cover material can include any one of a number of materials, or blends thereof, known to those of ordinary skill in the art, including trans-polybutadiene which may be present in an amount from at least 90 percent, with the remainder being the cis- and/or vinyl configuration.

British Patent No. 1,209,032 discloses a two- or three-piece golf ball having a core and a cover. The core or cover material can be any material capable of being crosslinked. In particular, the material can be a polymer or a copolymer of butadiene or isoprene. Preferably, the polymer component is polybutadiene having a cis content of greater than 50 percent by weight.

U.S. Pat. No. 3,992,014 discloses a one-piece, solid golf ball. The golf ball material is typically polybutadiene, with a stereo-configuration selected to be at least 60 percent cis-polybutadiene, with the remaining 40 percent being the trans-polybutadiene and/or 1,2-polybutadiene (vinyl) isomers.

U.S. Pat. No. 4,692,497 discloses a golf ball and material thereof formed by curing a diene polymer including polybutadiene and a metal salt of an alpha, beta ethylenically unsaturated acid using at least two free radical initiators.

U.S. Pat. No. 4,931,376 discloses a process for producing butadiene polymers for use in various applications, including golf ball cover materials. One embodiment of the invention employs a blended polymeric resin material, including at least 30 percent by weight of a trans-polybutadiene polymer as a golf ball cover on a two-piece ball. In a preferred embodiment, the golf ball cover material contains a blend including 30 to 90 percent by weight of a trans-polybutadiene polymer.

U.S. Pat. No. 4,971,329 discloses a solid golf ball made from a polybutadiene admixture of cis-1,4 polybutadiene and 1,2 polybutadiene, a metal salt of an unsaturated carboxylic acid, an inorganic filler, and a free radical initiator. The admixture has about 99.5 percent to about 95 percent by weight of cis-1,4 polybutadiene and about 0.5 percent to about 5 percent by weight of 1,2 polybutadiene.

U.S. Pat. No. 5,252,652 discloses a one-piece or multi-layered golf ball core with improved flying performance from a rubber composition comprising a base rubber, preferably 1,4-polybutadiene with a cis- content of at least 40 mole percent, an unsaturated carboxylic acid metal salt, an organic peroxide, and an organic sulfur compound and/or a metal salt thereof. The organic sulfur compound and/or a metal salt is typically present in an amount from about 0.05 to 2 parts per hundred by weight and the organic peroxide is typically present in an amount from about 0.5 to 3 parts per hundred by weight of the total polymer component.

European Patent No. 0 577 058 discloses a golf ball containing a core and a cover that is formed as two separate layers. The inner layer of the cover is molded over the core and is formed from ionomer resin. The outer layer of the cover is molded over the inner layer and is formed from a blend of natural or synthetic balata and a crosslinkable elastomer, such as polybutadiene. In one embodiment of the outer layer of the cover, the elastomer is 1,4-polybutadiene having a cis- structure of at least 40 percent, with the remaining 60 percent being the trans- isomer. A preferred embodiment contains a cis- structure of at least 90 percent and more preferably, a cis- structure of at least 95 percent.

U.S. Pat. No. 5,421,580 discloses a wound golf ball having a liquid center contained in a center bag, a rubber thread layer formed on the liquid center, and a cover over the wound layer and liquid center. The cover material can include any one of a number of materials, or blends thereof, known to those of ordinary skill in the art, including trans-polybutadiene and/or 1,2-polybutadiene (vinyl), such that the cover has a JIS-C hardness of 70–85; preferred trans- percentages are not disclosed.

U.S. Pat. No. 5,697,856 discloses a solid golf ball having a core and a cover wherein the core is produced by vulcanizing a base rubber composition containing a butadiene rubber having a cis-polybutadiene structure content of not less than 90 percent before vulcanization. The amount of trans-polybutadiene structure present after vulcanization is 10 to 30 percent, as amounts over 30 percent are alleged to detrimentally result in cores that are too soft with deteriorated resilience performance, and to cause a decrease in golf ball performance. The core includes a vulcanizing agent, a filler, an organic peroxide, and an organosulfur compound.

British Patent No. 2,321,021 discloses a solid golf ball having a core and a cover formed on the core and having a two-layered cover construction having an inner cover layer and an outer cover layer. The outer cover layer is comprised of a rubber composite that contains 0.05 to 5 parts by weight of an organic sulfide compound. The core rubber composition comprises a base rubber, preferably 1,4-polybutadiene having a cis- content of at least 40 percent by weight, a crosslinking agent, a co-crosslinking agent, an organic sulfide, and a filler. The crosslinking agent is typically an organic peroxide present in an amount from 0.3 to 5.0 parts by weight and the co-crosslinking agent is typically a metal salt of an unsaturated fatty acid present in an amount from 10 to 40 parts by weight. The organic sulfide compound is typically present from 0.05 to 5 parts by weight.

U.S. Pat. No. 5,816,944 discloses a solid golf ball having a core and a cover wherein the core has a JIS-C hardness of 50 to 80 and the cover has a Shore-D hardness of 50 to 60. The core material includes vulcanized rubber, such as cis-polybutadiene, with a crosslinker, an organic peroxide, an organosulfur compound and/or a metal-containing organosulfur compound, and a filler.

Additionally, conventional polymers that have a high percentage of the trans-polybutadiene conformation, such as DIENE 35NF, from Firestone Corp., that has 40 percent cis-isomer and 50 percent trans-polybutadiene isomer, and mixtures of high-cis- and high-trans-polybutadiene isomers, such as CARIFLEX BR1220, from Shell Corporation, and FUREN 88, from Asahi Chemical Co., respectively, typically do not yield high resilience values and therefore are not desirable. It is thus desired to prepare golf balls having lower compression, i.e., a softer ball, while having the same or higher resilience than conventional balls. It is alternatively desired to obtain the same or lower compression while achieving greater resilience.

SUMMARY OF THE INVENTION

All of the embodiments according to the invention below may be used in any golf ball. Particularly, each embodiment may be used in one of the three following embodiments. In the first such embodiment, the golf ball is a one-piece golf ball. In the second such embodiment, the golf ball includes a core and a cover disposed concentrically about the core and the reaction product is disposed in at least a portion of the core. In the third such embodiment, the golf ball includes a core having a center and at least one intermediate layer; and a cover disposed concentrically about the core, wherein the reaction product is disposed in a portion of the core.

The invention relates to a golf ball formed from the conversion reaction of an amount of polybutadiene, a free radical source, and a cis-to-trans catalyst including at least one Group VIA element at a sufficient reaction temperature to form a polybutadiene reaction product which includes an amount of trans-polybutadiene greater than the amount of trans-polybutadiene present before the conversion reaction. In one embodiment, the reaction product still includes a portion of the cis-to-trans catalyst including at least one elemental component. In one embodiment, the golf ball includes a cover having at least one of a dimple coverage of greater than about 60 percent, a hardness from about 35 to 80 Shore D, or a flexural modulus of greater than about 500 psi, and wherein the golf ball has at least one of a compression from about 50 to 120 or a coefficient of restitution of greater than about 0.7. In another embodiment, the reaction product has a first dynamic stiffness measured at −50° C. that is less than about 130 percent of a second dynamic stiffness measured at 0° C.

In one preferred embodiment, the Group VIA element includes a sulfur component of elemental sulfur, polymeric sulfur, or a combination thereof. In another embodiment, the Group VIA element includes selenium, tellurium, or a combination thereof. The cis-to-trans catalyst including a Group VIA element is typically present in an amount from about 0.01 to 25 parts per hundred of polybutadiene. In a preferred embodiment, the cis-to-trans catalyst is present in an amount from about 0.01 to 1 parts per hundred of polybutadiene. In a more preferred embodiment, the cis-to-trans catalyst is present in an amount from about 0.05 to 0.5 parts per hundred of polybutadiene. In another embodiment, the cis-to-trans catalyst is present in an amount sufficient to produce the polybutadiene reaction product so as to contain at least about 32 percent trans-polybutadiene isomer. In another embodiment, the cis-to-trans catalyst further comprises at least one of an inorganic sulfide compound, an organosulfur compound, an aromatic organometallic compound, a metal-organosulfur compound, or an aromatic organic compound.

In one embodiment, the polybutadiene reaction product includes less than about 7 percent vinyl isomer content based on the total polybutadiene. In a preferred embodiment, the polybutadiene reaction product includes less than about 4 percent vinyl isomer. In a more preferred embodiment, the polybutadiene reaction product includes less than about 2 percent vinyl isomer.

In another embodiment, the reaction product further includes a vulcanization accelerator, preferably in an amount sufficient to facilitate cis-to-trans conversion. In a preferred embodiment, the vulcanization accelerator includes at least one of sulfenamide, thiazole, dithiocarbamate, thiuram, xanthate, thiadiazine, thiourea, guanadine, or aldehydeamine. The accelerator is typically present in an amount from about 0.05 to 2 phr. In a preferred embodiment, the accelerator is present in an amount from about 0.1 to 1 phr.

In one embodiment, the portion of the core having the reaction product is the center. In another embodiment, the center includes a fluid. In yet another embodiment, the intermediate layer may include a wound layer of tensioned elastomeric material. In a preferred embodiment, the tensioned elastomeric material includes the reaction product. In another embodiment, the golf ball further includes a density-modifying filler.

The invention also relates to a method for forming a golf ball which includes combining (a) at least one of a cis-to-trans catalyst including at least one Group VIA element, (b) a free radical source, (c) a first resilient polymer component having a cis-polybutadiene component present in an amount greater than about 70 percent of the total polymer component, and optionally, (d) a crosslinking agent, converting a portion of the first resilient polymer component to a second resilient polymer component, wherein at least a portion of the cis-polybutadiene component is converted to a trans-polybutadiene component and wherein the polybutadiene in the second resilient polymer component is at least about 10 percent trans-polybutadiene and less than about 7 percent vinyl-polybutadiene, and forming the second resilient polymer component into at least a portion of the golf ball.

In one embodiment, the portion of the second resilient polymer component is formed into a solid sphere. In another embodiment, which may be alternative or in addition to the forming of the sphere, the portion may be formed into at least one layer disposed about the solid sphere. In the alternative embodiment, the sphere is formed but the portion is disposed in at least one layer disposed about the sphere. In the additive embodiment, an additional portion of the second resilient polymer component is formed into a cover disposed concentrically about a sphere.

In one embodiment, the polybutadiene component includes cis-polybutadiene present in an amount of at least 80 percent of the total first resilient polymer component. In another embodiment, a density-modifying filler is also included in the combining step. In yet another embodiment, the steps of combining the first resilient polymer component and the cis-to-trans catalyst and forming the portion, includes forming a sphere having a midpoint having a first amount of trans-polybutadiene and a surface having a second amount of trans-polybutadiene, wherein the first amount is at least about 6 percent less than the second amount.

In one embodiment, a portion of the sphere comprises a fluid. In another embodiment, a tensioned elastomeric material is wound about the sphere. In a preferred embodiment, the tensioned elastomeric material includes a reaction product including polybutadiene or polyisoprene and a cis-to-trans catalyst that includes the Group VIA elemental component.

In yet another embodiment, the forming includes single- or multi-step compression molding of the first resilient polymer component to convert the first resilient polymer component to the second resilient polymer, and forming the second resilient polymer component into a solid sphere. In a preferred embodiment, the compression molding takes 8 to 15 minutes. In a preferred embodiment, the converting and forming are substantially simultaneous.

The invention also relates to a golf ball prepared by a process which includes combining (a) at least one of a cis-to-trans catalyst including at least one Group VIA element, (b) a free radical source, and (c) a first resilient polymer component including a cis-polybutadiene component present in an amount greater than about 70 percent of the resilient polymer component, converting a portion of the first resilient polymer component to a second resilient polymer component in about 5 to 18 minutes, wherein at least a portion of the cis- isomer content is converted to a trans-isomer content and wherein the polybutadiene in the second resilient polymer component is at least about 10 percent trans-polybutadiene and less than about 7 percent vinyl-polybutadiene, and forming the second resilient polymer component into at least a portion of the golf ball.

The invention further relates to a golf ball including a material formed from the conversion reaction of a sufficient amount of polybutadiene, a free radical source, and a cis-to-trans catalyst including at least one Group VIA element, which reaction occurs at a sufficient temperature to form a polybutadiene reaction product which includes an amount of trans-polybutadiene greater than the amount of trans-polybutadiene present before the conversion reaction, wherein the reaction product includes a sphere which has a midpoint having a first hardness and a surface having a second hardness such that the second hardness differs from the first hardness by greater than 10 percent of the first hardness. In one embodiment, the reaction product still includes a portion of the cis-to-trans catalyst.

The golf ball may be prepared by combining at least (a) a cis-to-trans catalyst including at least one Group VIA element, (b) a free radical source, and (c) a first resilient polymer component including a cis-polybutadiene component present in an amount greater than about 70 percent of the total polymer, converting a portion of the first resilient polymer component to a second resilient polymer component in about 5 to 18 minutes at a sufficient temperature to convert at least a portion of the cis-polybutadiene component to a trans-polybutadiene component and wherein the polybutadiene in the second resilient polymer component is at least about 10 percent trans-polybutadiene and less than about 7 percent vinyl-polybutadiene, and forming the second resilient polymer component into at least a portion of the golf ball, wherein the second resilient component includes a sphere which has a midpoint having a first hardness and a surface having a second hardness such that the second hardness differs from the first hardness by greater than 10 percent of the first hardness.

The golf ball may also be prepared by combining at least (a) a cis-to-trans catalyst including at least one Group VIA element, (b) a free radical source, and (c) a first resilient polymer component including a cis-polybutadiene component present in an amount greater than about 70 percent of the total polymer component, converting a portion of the first resilient polymer component to a second resilient polymer component in about 5 to 18 minutes at a sufficient temperature to convert at least a portion of the cis-polybutadiene component to a trans-polybutadiene component and wherein the polybutadiene in the second resilient polymer component is at least about 10 percent trans-polybutadiene and less than about 7 percent vinyl-polybutadiene, and forming the second resilient polymer component into at least a portion of the golf ball, wherein the second resilient component has a first dynamic stiffness measured at −50° C. that is less than about 130 percent of a second dynamic stiffness measured at 0° C.

BRIEF DESCRIPTION OF THE DRAWINGS

Further features and advantages of the invention can be ascertained from the following detailed description that is provided in connection with the drawing(s) described below.

DEFINITIONS

Figure 1:
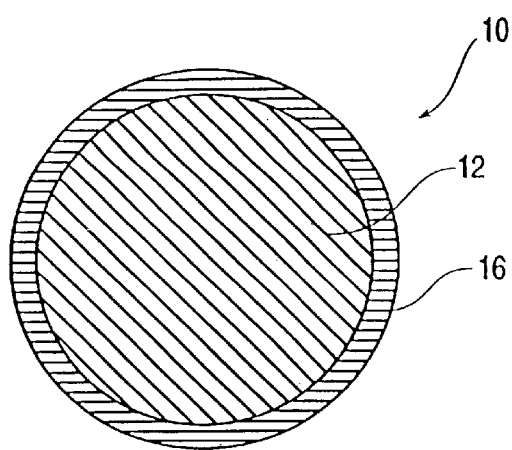
FIG. 1 is a cross-sectional view of a two-piece golf ball having a cover and a core according to the invention.

The term "about," as used herein in connection with one or more numbers or numerical ranges, should be understood to refer to all such numbers, including all numbers in a range.

As used herein, the term "active ingredients" is defined as the specific components of a mixture or blend that are essential to the chemical reaction.

As used herein, substituted and unsubstituted "aryl" groups means a hydrocarbon ring bearing a system of conjugated double bonds, typically comprising 4n+2 π (pi) ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include nitro groups.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. Compression values are dependent on the diameter of the article being measured. When the Atti Gauge is used to measure cores having a diameter of less than 1.680 inches, it should be understood that a metallic or other suitable shim is used to make the measured object 1.680 inches in diameter. However, when referring to the compression of a core, it is preferred to use a compressive load measurement. The term "compressive load" is defined as the normalized load in pounds for a 10.8-percent diametrical deflection for a spherical object having a diameter of 1.58 inches.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, the term "coefficient of restitution" for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 μm. The probe dynamically penetrates the surface of a sample material. Material samples of spherical cores were prepared by sectioning out a 6-mm-thick layer along the equator of core to produce a disk 6 mm thick with one surface containing the center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-μm amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

As used herein, the terms "Group VIA component" or "Group VIA element" mean a component that includes a sulfur component, a selenium component, or a tellurium component, or a combination thereof.

As used herein, the term "fluid" includes a liquid, a paste, a gel, a gas (such as air), or any combination thereof.

As used herein, the term "loss tangent," or tan δ, is defined as unrecoverable energy divided by recoverable energy, where the energy of deflection is measured at the operating criteria specified herein for dynamic stiffness. The loss tangent was acquired using the same Dynamic Mechanical Analyzer and setting as above.

As used herein, the term "molecular weight" is defined as the absolute weight average molecular weight.

As used herein, the term "multilayer" means at least two layers and includes liquid center balls, wound balls, hollow-center balls, and balls with at least two intermediate layers and/or an inner or outer cover.

As used herein, the term "parts per hundred", also known as "phr", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein, the term "substantially free" means less than about 5 weight percent, preferably less than about 3 weight percent, more preferably less than about 1 weight percent, and most preferably less than about 0.01 weight percent.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

DETAILED DESCRIPTION OF THE INVENTION

The present invention relates to one-piece golf balls, two piece golf balls having a core and a cover, and multilayer golf balls having a solid, hollow, or fluid-filled center, at least one intermediate layer disposed concentrically adjacent to the center, and a cover. At least one of the center, cover, or intermediate layer includes a reaction product that includes a cis-to-trans catalyst, a resilient polymer component having polybutadiene, a free radical source, and optionally, a crosslinking agent, a filler, or both. Preferably, the reaction product has a first dynamic stiffness measured at −50° C. that is less than about 130 percent of a second dynamic stiffness measured at 0 ° C. More preferably, the first dynamic stiffness is less than about 125 percent of the second dynamic stiffness.

The invention also includes a method to convert the cis- isomer of polybutadiene to the trans- isomer during a molding cycle and to form a golf ball. Various combinations of polymers, cis-to-trans catalysts, fillers, crosslinkers, and a source of free radicals, may be used. To obtain a higher resilience and lower compression, a high-molecular weight polybutadiene with a cis- isomer content preferably greater than about 70 percent is converted to increase the percentage of trans- isomer content at any point in the golf ball or portion thereof, preferably to increase the percentage throughout substantially all of the golf ball or portion thereof, during the molding cycle. More preferably, the cis-polybutadiene isomer is present in an amount of greater than about 80 percent of the total polybutadiene content. Most preferably, the cis-polybutadiene isomer is present in an amount of greater than about 96 percent of the total polybutadiene content. Without wishing to be bound by any particular theory, it is believed that a low amount of 1,2- polybutadiene isomer ("vinyl-polybutadiene") is desired in the initial polybutadiene, and the reaction product. Typically, the vinyl polybutadiene isomer content is less than about 7 percent. Preferably, the vinyl polybutadiene isomer content is less than about 4 percent. More preferably, the vinyl polybutadiene isomer content is less than about 2 percent. Without wishing to be bound by any particular theory, it is also believed that the resulting mobility of the combined cis- and trans-polybutadiene backbone is responsible for the lower modulus and higher resilience of the reaction product and golf balls including the same.

To produce a polymer reaction product that exhibits the higher resilience and lower modulus (low compression) properties that are desirable and beneficial to golf ball playing characteristics, high-molecular-weight cis-1,4- polybutadiene, preferably may be converted to the trans- isomer during the molding cycle. The polybutadiene material typically has a molecular weight of greater than about 200,000. Preferably, the polybutadiene molecular weight is greater than about 250,000, more preferably between about 300,000 and 500,000. Without wishing to be bound by any particular theory, it is believed that the cis-to-trans catalyst component, in conjunction with the free radical source, acts to convert a percentage of the polybutadiene polymer component from the cis- to the trans- conformation. The cis-to- trans conversion requires the presence of a cis-to-trans catalyst, such as a Group VIA element, which catalyst may optionally further include an organosulfur or metal- containing organosulfur compound, a substituted or unsub- stituted aromatic organic compound, an inorganic sulfide compound, or mixtures thereof. As used herein, "cis-to-trans catalyst," means any component or a combination thereof that will convert at least a portion of cis-polybutadiene isomer to trans-polybutadiene isomer at a given temperature. The cis-to-trans catalyst component may include one or more of the other cis-to-trans catalysts described herein, but must include at least one Group VIA component. The Group VIA component preferably includes sulfur or polymeric sulfur.

Suitable substituted or unsubstituted aromatic organic components that can optionally also be included in the cis-to-trans catalyst include, but are not limited to, compo- nents having the formula $(R_1)_x$—$R_3$—M—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substi- tution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfona- mide; and phosphates and phosphites. When M is a metal component, it may be any suitable elemental metal available to those of ordinary skill in the art. Typically, the metal will be a transition metal, although preferably it is tellurium or selenium. Several preferred aromatic components for use in the cis-to-trans catalyst are those having the formula:

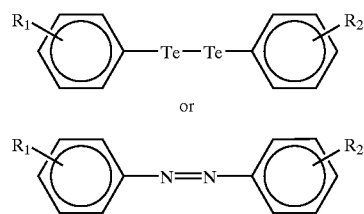

In the first of these two structures, selenium may be used in place of the tellurium if desired. Thus, in the most preferred embodiments, $R_3$ and $R_4$ are each a $C_6$ aryl group and M includes either an azo group, tellurium, or selenium.

Additional suitable organosulfur components that can optionally be included in the cis-to-trans catalyst include, but are not limited to, 4,4'-diphenyl disulfide; 4,4'-ditolyl disulfide; 4,4'-diphenyl acetylene; 2,2'-benzamido diphenyl disulfide; bis(2-aminophenyl) disulfide; bis(4-aminophenyl) disulfide; bis(3-aminophenyl) disulfide; 2,2'-bis(4- aminonaphthyl) disulfide; 2,2'-bis(3-aminonaphthyl) disul- fide; 2,2'-bis(4-aminonaphthyl) disulfide; 2,2'-bis(5- aminonaphthyl) disulfide; 2,2'-bis(6-aminonaphthyl) disulfide; 2,2'-bis(7-aminonaphthyl) disulfide; 2,2'-bis(8- aminonaphthyl) disulfide; 1,1'-bis(2-aminonaphthyl) disul- fide; 1,1'-bis(3-aminonaphthyl) disulfide; 1,1'-bis(3- aminonaphthyl) disulfide; 1,1'-bis(4-aminonaphthyl) disulfide; 1,1'-bis(5-aminonaphthyl) disulfide; 1,1'-bis(6- aminonaphthyl) disulfide; 1,1'-bis(7-aminonaphthyl) disul- fide; 1,1'-bis(8-aminonaphthyl) disulfide; 1,2'-diamino-1,2'- dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disul- fide; bis(4-fluorophenyl) disulfide; bis(4-iodophenyl) disul- fide; bis(2,5-dichlorophenyl) disulfide; bis(3,5- dichlorophenyl) disulfide; bis (2,4-dichlorophenyl) disulfide; bis(2,6-dichlorophenyl) disulfide; bis(2,5- dibromophenyl) disulfide; bis(3,5-dibromophenyl) disul- fide; bis(2-chloro-5-bromophenyl) disulfide; bis(2,4,6- trichlorophenyl) disulfide; bis(2,3,4,5,6-pentachlorophenyl) disulfide; bis(4-cyanophenyl) disulfide; bis(2-cyanophenyl) disulfide; bis(4-nitrophenyl) disulfide; bis(2-nitrophenyl) disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl) disulfide; bis(2-acetylphenyl) disulfide; bis(4-formylphenyl) disulfide; bis(4carbamoylphenyl) disulfide; 1,1'-dinaphthyl disulfide; 2,2'-dinaphthyl disulfide; 1,2'-dinaphthyl disulfide; 2,2'-bis(1-chlorodinaphthyl) disulfide; 2,2'-bis(1-bromonaphthyl) disulfide; 1,1'-bis(2-chloronaphthyl) disulfide; 2,2'-bis(1-cyanonaphthyl) disulfide; 2,2'-bis(1-acetylnaphthyl) disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. The organosulfur component, when included in the cis-to-trans catalyst, is preferably present in an amount sufficient to produce the reaction product so as to contain at least about 12 percent trans-polybutadiene isomer, but typically is greater than about 32 percent trans-polybutadiene isomer based on the total resilient polymer component. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable optional inorganic sulfide components include, but are not limited to titanium sulfide, manganese sulfide, and sulfide analogs of iron, calcium, cobalt, molybdenum, tungsten, copper, selenium, yttrium, zinc, tin, and bismuth. The cis-to-trans catalyst may thus be a blend, such as of the Group VIA element with any of the other cis-to-trans catalysts discussed herein, e.g., an aromatic organic compound, an organosulfur compound, an inorganic sulfide compound, or a combination thereof.

Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt. It is to be understood that when an elemental or polymeric sulfur component is selected as the cis-to-trans catalyst, an accelerator may be used to improve the performance of the cis-to-trans catalyst and increase the trans- conversion for a given amount of sulfur catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

The cis-to-trans catalyst is preferably present in an amount from about 0.01 to 25 parts per hundred of the total resilient polymer component. More preferably, the cis-to-trans catalyst is present in an amount from about 0.01 to 1 parts per hundred of the total resilient polymer component. Most preferably, the cis-to-trans catalyst is present in an amount from about 0.05 to 0.5 parts per hundred of the total resilient polymer component. The cis-to-trans catalyst is typically present in an amount sufficient to produce the reaction product so as to increase the trans- polybutadiene isomer content to contain from about 5 percent to 70 percent trans-polybutadiene based on the total resilient polymer component.

The measurement of trans- isomer content of polybutadiene referred to herein was and can be accomplished as follows. Calibration standards are prepared using at least two polybutadiene rubber samples of known trans- content, e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a commercially available Fourier Transform—Infrared (FT-IR) spectrometer equipped with a Photoacoustic (PAS) cell, a PAS spectrum of each standard was obtained using the following instrument parameters: scan at speed of 2.5 KHz (0.16 cm/sec optical velocity), use a 1.2 KHz electronic filter, set an undersampling ratio of 2 (number of laser signal zero crossings before collecting a sample), co-add a minimum of 128 scans at a resolution of 4 $cm^{-1}$ over a range of 375 to 4000 $cm^{-1}$ with a sensitivity setting of 1.

The cis-, trans-, and vinyl-polybutadiene peaks found between 600 and 1100$cm^{-1}$ from the PAS spectra can be integrated. The area under the trans-polybutadiene peaks as a fraction of the total area under the three isomer peaks can then be determined to construct a calibration curve of the trans-polybutadiene area fraction versus the actual trans-polybutadiene content. The correlation coefficient ($R^2$) of the resulting calibration curve must be a minimum of 0.95.

A PAS spectrum is obtained using the parameters described above for the unknown core material at the point of interest (e.g., the surface or center of the core) by filling the PAS cell with a sample containing a freshly cut, uncontaminated surface free of foreign matters such as mold release and the like. The trans-polybutadiene area fraction of the unknown is analyzed to determine the actual trans-isomer content from the calibration curve. An increase in the trans- content anywhere in the article being manufactured or tested should be understood herein to refer to the trans- at any point in the article.

In one known circumstance when barium sulfate is included, the above method for testing trans- content may be less accurate. Thus, an additional or alternative test of the trans- content of polybutadiene is as follows. Calibration standards are prepared using at least two polybutadienes of known trans- content (e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a Fourier Transform—Raman (FT-Raman) spectrometer equipped with a near-infrared laser, a Stokes Raman spectrum should be obtained from each standard using the following instrument parameters: sufficient laser power to obtain a good signal to noise ratio without causing excessive heating or fluorescence (typically about 400 to 800 mW is suitable); a resolution of 2 $cm^{-1}$; over a Raman shift spectral range of about 400 to 4000 $cm^{-1}$; and co-adding at least 300 scans.

A calibration curve may be constructed from the data generated above, using a chemometrics approach and software such as PLSplus/IQ from Galactic Industries Corp. of Salem, N.H. An acceptable calibration was obtained with this software using a PLS-1 curve generated using an SNV (detrend) pathlength correction, a mean center data preparation, and a 5-point SG second derivative over the spectral range from about 1600 to 1700 $cm^{-1}$. The correlation coefficient ($R^2$) of the resulting calibration curve must be a minimum of 0.95.

A Raman spectrum of the unknown core material is obtained using this instrument at the point of interest in the unknown sample (e.g., surface or center of the golf ball core). The unknown must be free of foreign matter, such as mold release, etc. Analyze the spectrum of the unknown using the PLS calibration curve to determine trans-polybutadiene isomer content of the unknown sample.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. It should be understood by those of ordinary skill in the art that the presence of certain cis-to-trans catalysts according to the invention may require a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Crosslinkers are included to increase the hardness of the reaction product. Suitable crosslinking agents include one or more metallic salts of unsaturated fatty acids or monocarboxylic acids, such as zinc, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the resilient polymer component, preferably from about 10 to 40 percent of the resilient polymer component, more preferably from about 10 to 30 percent of the resilient polymer component. When an organosulfur is included in the cis-to-trans catalyst, zinc diacrylate may be selected as the crosslinking agent and is present in an amount of less than about 25 phr.

Fillers added to one or more portions of the golf ball typically include processing aids or compounds to affect Theological and mixing properties, the specific gravity (i.e., density-modifying fillers), the modulus, the tear strength, reinforcement, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Foamed polymer blends may be formed by blending ceramic or glass microspheres with polymer material. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The resilient polymer component may also include one or more additional polymers, such as a thermoplastic copolyesterester block copolymer, dynamically vulcanized thermoplastic elastomer, hydrogenated or non-hydrogenated styrene-butadiene elastomer with functional groups such as maleic anhydride or sulfonic acid attached, thermoplastic polyurethane or polymers made using a metallocene catalyst, or blends thereof. Suitable thermoplastic copolyetheresters include HYTREL® 3078 and HYTREL® 4069, which are commercially available from E.I. DuPont de Nemours & Co. of Wilmington, Del. Suitable dynamically vulcanized thermoplastic elastomers include SANTOPRENE®, commercially available from Advanced Elastomer Systems of Akron, Ohio. Examples of suitable functionalized styrene-butadiene elastomers, include KRATON FG-1901x and FG-1921x, which are available from the Shell Corporation of Houston, Tex. Examples of suitable thermoplastic polyurethanes include ESTANE® 58133 and ESTANE® 58144, which are commercially available from the B.F. Goodrich Company of Cleveland, Ohio. Further, the materials for the mantle layer described above may be in the form of a foamed polymeric material. For example, suitable metallocene polymers include foams of thermoplastic elastomers based on metallocene single-site catalyst-based foams. Suitable thermoplastic polyetheramides include PEBAX® 2533, PEBAX® 1205 and PEBAX® 4033 which are available from Elf-Atochem of Philadelphia, Pa. Suitable thermoplastic ionomer resins include any number of olefinic based ionomers including SURLYN® and IOTEK®, which are commercially available from E.I. DuPont de Nemours & Co. of Wilmington, Del., and Exxon Corporation of Irving, Tex., respectively. When the resilient polymer component includes any additional polymers in addition to polybutadiene, polybutadiene will be present in at least 50 phr of the resilient polymer component, preferably in an amount greater than about 90 phr.

The resilient polymer component, additional polymers, free-radical initiator, filler(s), and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking. The mixing temperature depends upon the type of polymer components, and more importantly, on the type of free-radical initiator. For example, when using di(2-t-butyl-peroxyisopropyl)benzene as the free-radical initiator, a mixing temperature of about 80° C. to 125 ° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed about 95° C. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle are selected based upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 340° F. for a duration of 15 minutes. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 290° F. for 40 minutes; then ramping the mold to 340° F. where it is held for a duration of 20 minutes. In a preferred embodiment of the current invention, a single-step cure cycle is employed. Single-step processes are effective and efficient, reducing the time and cost of a two-step process. The resilient polymer component, polybutadiene, cis-to-trans conversion catalyst, additional polymers, free-radical initiator, filler, and any other materials used in forming either the golf ball center or any portion of the core, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cured resilient polymer component, which contains a greater amount of trans-polybutadiene than the uncured resilient polymer component, is formed into an article having a first hardness at a point in the interior and a surface having a second hardness such that the second hardness differs from the first hardness by greater than 10 percent of the first hardness. Preferably, the article is a sphere and the point is the midpoint of the article. In another embodiment, the second hardness differs from the first by greater than 20 percent of the first hardness. The cured article also has a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably a midpoint and the article is preferably a sphere.

The compression of the core, or portion of the core, of golf balls prepared according to the invention is preferably below about 50, more preferably below about 25.

The cover provides the interface between the ball and a club. Properties that are desirable for the cover are good moldability, high abrasion resistance, high tear strength, high resilience, and good mold release, among others. The cover typically has a thickness to provide sufficient strength, good performance characteristics and durability. The cover of the golf balls typically has a thickness of at least about 0.03 inches, preferably 0.03 to 0.125 inches, and more preferably from about 0.05 to 0.1 inches. The golf balls also typically have at least about 60 percent dimple coverage, preferably at least about 70 percent dimple coverage, of the surface area of the cover.

The cover can include any suitable cover or intermediate layer materials, known to those of ordinary skill in the art, including thermoplastic and thermosetting materials, but preferably the cover or intermediate layer can include any suitable materials, such as ionic copolymers of ethylene and an unsaturated monocarboxylic acid which are available under the trademark SURLYN of E.I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, aleic, fumaric or itaconic acid.

This golf ball can likewise include one or more homopolymeric or copolymeric cover materials, such as:
(1) Vinyl resins, such as those formed by the polymerization of vinyl chloride, or by the copolymerization of vinyl chloride with vinyl acetate, acrylic esters or vinylidene chloride;
(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;
(3) Polyurethanes, such as those prepared from polyols and diisocyanates or polyisocyanates and those disclosed in U.S. Pat. No. 5,334,673;
(4) Polyureas, such as those disclosed in U.S. Pat. No. 5,484,870;
(5) Polyamides, such as poly(hexamethylene adipamide) and others prepared from diamines and dibasic acids, as well as those from amino acids such as poly (caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly (ethylene terephthalate), poly(butylene terephthalate), poly (ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

The cover may also be formed from the present invention, as discussed herein.

Depending on the desired properties, balls prepared according to the invention can exhibit substantially the same or higher resilience, or coefficient of restitution (CoR), with a decrease in compression or modulus, compared conventional balls. Additionally, balls prepared according to the invention can also exhibit substantially higher resilience, or coefficient of restitution (CoR), without an increase in compression, compared to conventional balls. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is a golf ball core. The polybutadiene reaction product preferably has a loss tangent below about 0.1 at −50° C., and more preferably below about 0.07 at −50° C.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball polybutadiene material of the present invention typically has a flexural modulus of from about 500 psi to 300,000 psi, preferably from about 2000 to 200,000 psi. The golf ball polybutadiene material typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material. The dynamic shear storage modulus, or storage modulus, of the golf ball polybutadiene material at about 23° C. is typically at least about 10,000 dyn/cm$^2$, preferably from about $10^4$–$10^{10}$ dyn/cm$^2$, more preferably from about $10^6$ to $10^{10}$ dyn/cm$^2$.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to anticipate golf ball performance. In one preferred embodiment, these measurements may be made between about −20° C. to −50° C.

Additionally, the unvulcanized rubber, such as polybutadiene, in golf balls prepared according to the invention typically has a Mooney viscosity greater than about 20, preferably greater than about 30, and more preferably greater than about 40. Mooney viscosity is typically measured according to ASTM D-1646.

When golf balls are prepared according to the invention, they typically will have dimple coverage greater than about 60 percent, preferably greater than about 65 percent, and more preferably greater than about 70 percent. The flexural modulus of the cover on the golf balls, as measured by ASTM method D-790, is typically greater than about 500 psi, and is preferably from about 500 psi to 150,000 psi. The hardness of the cover is typically from about 35 to 80 Shore D, preferably from about 40 to 78 Shore D, and more preferably from about 45 to 75 Shore D.

Figure 2:
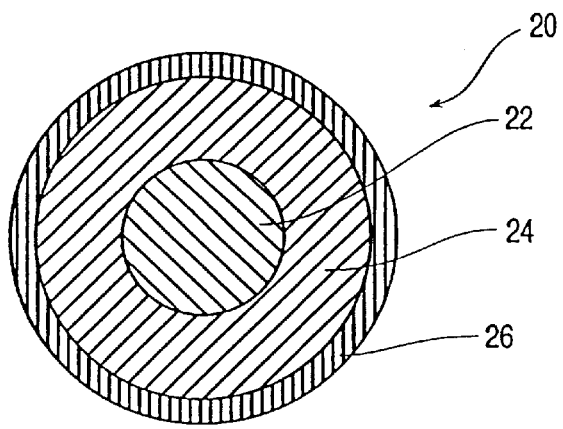
FIG. 2 is a cross-section of a golf ball having an intermediate layer between a cover and a center according to the invention.
Figure 3:
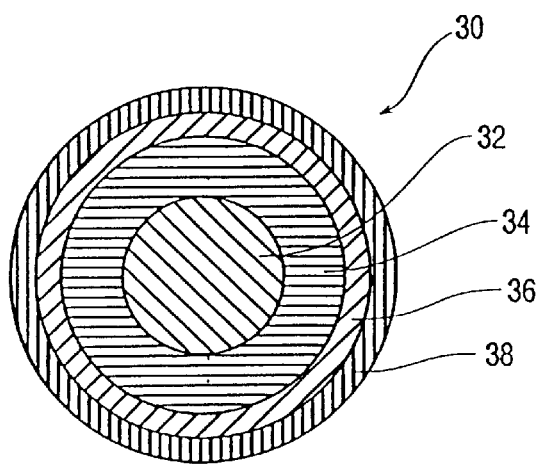
FIG. 3 is a cross-section of a golf ball having more than one intermediate layer between a cover and a center according to the invention.

Referring to FIG. 1, a golf ball 10 of the present invention can include a core 12 and a cover 16 surrounding the core 12. Referring to FIG. 2, a golf ball 20 of the present invention can include a center 22, a cover 26, and at least one intermediate layer 24 disposed between the cover and the center. Each of the cover and center may include more than one layer; i.e., the golf ball can be a conventional three-piece wound ball, a two-piece ball, a ball having a multi-layer core or an intermediate layer or layers, etc. Thus, referring to FIG. 3, a golf ball 30 of the present invention can include a center 32, a cover 38, and intermediate layers 34 and 36 disposed between the cover and the center. Although FIG. 3 shows only two intermediate layers, it will be appreciated that any number or type of intermediate layers may be used, as desired.

EXAMPLES

A variety of metal sulfide cis-to-trans catalysts that successfully converted a portion of the cis-polybutadiene isomer to the trans- isomer are presented in Table 1. CARIFLEX BR-1220 polybutadiene (100 phr) was reacted with zinc oxide (5 phr), dicumyl peroxide (3 phr, the free radical initiator), and zinc diacrylate (25 phr), to form the reaction product as described in the present invention.

Trans- isomer conversion percentages range from below 6 percent to above 16 percent for the various catalysts that are present in amounts ranging from below 2 phr to above 5 phr. The table clearly demonstrates the effectiveness of numerous different cis-to-trans catalysts, at varying concentrations, for increasing the trans-polybutadiene content.

TABLE 1

Metal Sulfide Conversion Examples

| Polybutadiene (CARIFLEX 1220) | 100 | 100 | 100 | 100 | 100 | 100 | 100 | 100 | 100 | 100 | 100 | 100 | 100 |
|---|---|---|---|---|---|---|---|---|---|---|---|---|---|
| Zinc oxide | 5 | 5 | 5 | 5 | 5 | 5 | 5 | 5 | 5 | 5 | 5 | 5 | 5 |
| Dicumyl peroxide | 3 | 3 | 3 | 3 | 3 | 3 | 3 | 3 | 3 | 3 | 3 | 3 | 3 |
| Zinc Diacrylate | 25 | 25 | 25 | 25 | 25 | 25 | 25 | 25 | 25 | 25 | 25 | 25 | 25 |
| Cis-Trans "Catalyst" | | | | | | | | | | | | | |
| FeS | 2.87 | | | | | | | | | | | | |
| MnS | | 2.65 | | | | | | | | | | | |
| $TiS_2$ | | | 1.70 | | | | | | | | | | |
| CaS | | | | 2.20 | | | | | | | | | |
| CoS | | | | | 2.77 | | | | | | | | |
| $MoS_2$ | | | | | | 2.43 | | | | | | | |
| $WS_2$ | | | | | | | 3.77 | | | | | | |
| $Cu_2S$ | | | | | | | | 4.65 | | | | | |
| $SeS_2$ | | | | | | | | | 2.19 | | | | |
| $Y_2S_3$ | | | | | | | | | | 2.76 | | | |
| ZnS | | | | | | | | | | | 2.97 | | |
| $Sb_2S_3$ | | | | | | | | | | | | 3.45 | |
| $Bi_2S_3$ | | | | | | | | | | | | | 5.22 |
| % Trans BR isomer Precure | 1.5 | 1.5 | 1.5 | 1.5 | 1.5 | 1.5 | 1.5 | 1.5 | 1.5 | 1.5 | 1.5 | 1.5 | 1.5 |
| % Trans BR isomer Postcure | 10.5 | 16.1 | 17.0 | 8.3 | 10.3 | 10.1 | 9.2 | 5.8 | 5.2 | 10.2 | 10.1 | 10.7 | 10.5 |

Example 1

A Core Prepared From According to the Invention, Employing an Organosulfur Cis-to-trans Catalyst A core according to the present invention was created employing an organosulfur compound as the cis-to-trans conversion catalyst. The resultant core properties clearly demonstrate the advantages of a golf ball core made according to the current invention as compared to example cores constructed with conventional technology. The components and physical characteristics are presented in Table 2.

The compressive load of cores prepared according to the invention is approximately half of the compressive load of cores constructed in accordance with U.S. Pat. No. 5,697,856, U.S. Pat. No. 5,252,652, and U.S. Pat. No. 4,692,497, while at the same time retaining roughly the same, and in some cases higher, CoR (resilience). The core made according to the current invention has a lower compressive load (soft), yet is resilient (fast). The compressive load is greater than that of a core constructed in accordance with U.S. Pat. No. 3,239,228, but has a significantly higher CoR. The core of U.S. Pat. No. 3,239,228 is very soft and very slow (very low CoR).

The percent change in dynamic stiffness from 0° C. to −50° C. was also measured at both the edge and center of the cores. The dynamic stiffness at both the edge and the center of the core of the current invention varied only slightly, less than 20 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans- conversion was also measured at both the center and edge of the core prepared according to the current invention, and for cores prepared as disclosed in the same four patents mentioned above, allowing a trans-gradient to be calculated. The core according to the current invention had a trans- gradient of about 32 percent from edge to center. For the core prepared according to the current invention, the pre- and post-cure trans- percentages was also measured to determine the effectiveness of that process. The percentage of polybutadiene converted to the trans- isomer ranged from almost 40 percent at the center to greater than 55 percent at the edge. Two of the cores prepared according to conventional technology, U.S. Pat. No. 3,239,228 and U.S. Pat. No. 4,692,497, had a zero trans- gradient. A third core, prepared according to U.S. Pat. No. 5,697,856, had only a slight trans- gradient, less than 18 percent from edge to center. A fourth core, prepared according to U.S. Pat. No. 5,252,652, had a very large gradient, almost 65 percent from edge to center.

Example 2

A Core Prepared From According to the Invention Employing an Inorganic Sulfide Cis-to-trans Catalyst A core according to the present invention was created employing an inorganic sulfide compound as the cis-to-trans conversion catalyst. The resultant core properties clearly demonstrate the advantages of a golf ball core made according to the current invention as compared to example cores constructed with conventional technology. The components and physical characteristics are presented in Table 2.

The compressive load is approximately half of the compressive load of three cores constructed in accordance with U.S. Pat. No. 5,697,856, U.S. Pat. No. 5,252,652, and U.S. Pat. No. 4,692,497, while at the same time retaining roughly the same, and in some cases, a higher CoR (resilience). The core made according to the current invention is soft, yet resilient (fast). The compressive load is greater than a core constructed in accordance with U.S. Pat. No. 3,239,228, but has a significantly higher CoR. The core of U.S. Pat. No. 3,239,228 is very soft and very slow (low CoR).

The percent change in dynamic stiffness from 0° C. to −50° C. was also Do measured at both the edge and center of the cores. The dynamic stiffness at both the edge and the center of the core of the current invention varied only slightly, less than 125 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans- conversion was also measured at both the center and edge of the core prepared according to the current invention, and for cores prepared according to the same four patents mentioned above, allowing a trans-gradient to be calculated. The core according to the current invention had a trans- gradient of about 45 percent from edge to center. Two of the cores prepared in accordance with U.S. Pat. No. 3,239,228 and U.S. Pat. No. 4,692,497 had a zero trans- gradient. A third core, prepared in accordance with U.S. Pat. No. 5,697,856, had only a slight trans-gradient, less than 18 percent from edge to center. A fourth core, prepared in accordance with U.S. Pat. No. 5,252,652, had a very large gradient, almost 65 percent, from edge to center.

Example 3

A Core Prepared From According to the Invention, Employing a Blend of Organosulfur and Inorganic Sulfide Cis-to-trans Catalyst A core according to the present invention was created employing a blend of organosulfur and inorganic sulfide compounds as the cis-to-trans conversion catalyst. The resultant core properties clearly demonstrate the advantages of a golf ball core made according to the current invention as compared to example cores constructed with conventional technology. The components and physical characteristics are presented in Table 2.

The compressive load is approximately half of the compressive load of three cores constructed in accordance with U.S. Pat. No. 5,697,856, U.S. Pat. No. 5,252,652, and U.S. Pat. No. 4,692,497, while at the same time retaining roughly the same, and in some cases a higher CoR (resilience). The core made according to the current invention is soft, yet resilient (fast). The compressive load of the invention is greater than a fourth core constructed in accordance with U.S. Pat. No. 3,239,228, but has a significantly higher CoR. The core constructed in accordance with U.S. Pat. No. 3,239,228 is very soft and very slow (low CoR).

The percent change in dynamic stiffness from 0° C. to −50° C. was also measured at both the edge and center of the cores. The dynamic stiffness at both the edge and the center of the core of the current invention varied only slightly, less than 121 percent, over the temperature range investigated. The core made in accordance with U.S. Pat. No. 3,239,228 varied over 230 percent, whereas the cores made according to other conventional technology had a dynamic stiffness that varied by greater than 130 percent, and typically by as much as 150 percent, over the same temperature range.

The percent of trans- conversion was also measured at both the center and edge of the core prepared according to the current invention, and for cores prepared to the same four patents mentioned above, allowing a trans- gradient to be calculated. The core according to the current invention had a trans- gradient that about 44 percent from edge to center. For the core prepared according to the current invention, the pre- and post-cure trans- percentages was also measured to determine the effectiveness of that process. The percentage of polybutadiene converted to the trans- isomer ranged from almost 26 percent at the center to greater than 45 percent at the edge. Two of the cores prepared in accordance with U.S. Pat. No. 3,239,228 and U.S. Pat. No. 4,692,497 had a zero trans- gradient. A third core prepared in accordance with U.S. Pat. No. 5,697,856 had only a slight trans- gradient, less than 18 percent from edge to center. A fourth core, prepared in accordance with U.S. Pat. No. 5,252,652 had a very large gradient, almost 65 percent from edge to center.

TABLE 2

| Chemical Constituents | Invention Examples #1 | Invention Examples #2 | Invention Examples #3 | Examples of Conventional Golf Balls U.S. Pat. No. 3239228 | U.S. Pat. No. 5816944 U.S. Pat. No. 5697856 | U.S. Pat. No. 5252652 | U.S. Pat. No. 4971329 U.S. Pat. No. 4692497 |
|---|---|---|---|---|---|---|---|
| Polybutadiene (Shell, CARIFLEX 1220) | 100 | 100 | 100 | | N/A | N/A | N/A |
| Polybutadiene (Firestone, 35 NF) | | | | 100 | N/A | N/A | N/A |
| DMDS | | | | 2.1 | N/A | N/A | N/A |
| Carbon Black (RA) | | | | 15 | N/A | N/A | N/A |
| Wood Flour | | | | 24 | N/A | N/A | N/A |
| Sulfur | | | | 24 | N/A | N/A | N/A |
| Stearic Acid | | | | 1.5 | N/A | N/A | N/A |
| Reogen | | | | 15 | N/A | N/A | N/A |
| Vanox MBPC | | | | 2 | N/A | N/A | N/A |
| Triethanolamine | | | | 4 | N/A | N/A | N/A |
| Zinc oxide | 5 | 5 | 5 | 5 | N/A | N/A | N/A |
| Dicumyl peroxide | 3 | 1.9 | 2 | | N/A | N/A | N/A |
| Zinc Diacrylate | 25 | 25 | 25 | | N/A | N/A | N/A |
| Cis-Trans "Catalyst" | | | | | N/A | N/A | N/A |
| MnS | | 0.82 | | | N/A | N/A | N/A |
| Ditolyldisulfide | 2.5 | | 1.5 | | N/A | N/A | N/A |
| $CU_2S$ | | | 1 | | N/A | N/A | N/A |
| Resultant Core Properties | | | | | | | |
| Load (lbs) @ 10.8% Deflection 1.580" core | 165.5 | 191.4 | 191.8 | 61.1 | 325 | 390 | 480 |
| Coefficient of Restitution @ 125 ft/s | 0.783 | 0.777 | 0.785 | 0.599 | 0.779 | 0.805 | 0.775 |
| Hardness Shore C | | | | | | | |
| Surface | 61 | 76 | 62 | 35 | 75 | 80 | 80.5 |
| Center | 52 | 52 | 59 | 30 | 70 | 61 | 66.5 |
| Dynamic Stiffness @ 0° C. (N/m) | | | | | | | |
| Edge* | 25338 | 27676 | 28493 | 8312 | 62757 | 83032 | 72235 |
| Center | 20783 | 17390 | 27579 | 8361 | 61071 | 26264 | 50612 |
| Dynamic Stiffness @ −50° C. (N/m) | | | | | | | |
| Edge* | 30265 | 34523 | 34455 | 19394 | 92763 | 109053 | 108242 |
| Center | 23022 | 20603 | 32195 | 18617 | 89677 | 28808 | 83183 |
| Dynamic Stiffness Ratio at −50° C./0° C. | | | | | | | |
| Edge* | 119% | 125% | 121% | 233% | 148% | 131% | 150% |
| Center | 111% | 118% | 117% | 223% | 147% | 110% | 164% |
| Loss Tangent 0° C. | | | | | | | |
| Edge* | 0.024 | 0.027 | 0.024 | 0.074 | 0.039 | 0.037 | 0.045 |
| Center | 0.025 | 0.023 | 0.023 | 0.073 | 0.033 | 0.025 | 0.043 |
| Loss Tangent −50° C. | | | | | | | |
| Edge* | 0.098 | 0.084 | 0.097 | 0.183 | 0.142 | 0.119 | 0.099 |
| Center | 0.067 | 0.071 | 0.085 | 0.180 | 0.129 | 0.059 | 0.095 |
| % Trans BR isomer Precure | 1.5 | 1.5 | 1.5 | 50 | N/A | N/A | N/A |
| % Trans BR isomer Postcure | | | | | | | |
| Surface | 55.8 | 8.4 | 45.5 | 50 | 30.2 | 24.6 | 1.5 |
| Center | 37.8 | 4.6 | 25.5 | 50 | 24.7 | 8.5 | 1.5 |
| % Trans Variation (Surf. − Center)/Surf. | 32% | 45% | 44% | 0% | 18% | 65% | 0% |

*Edge is measured approximately 5 mm from the exterior surface of the measured article.

TABLE 3

| | Conventional | Example |
|---|---|---|
| Example 4: Dual Core | | |
| Center 1.15" Diameter | | |
| Shell 1220 | 100 | 100 |
| ZDA | 20 | 20 |
| Varox 802-40KE-HP | 0.89 | 0 |
| Dicumyl Peroxide | 0 | 2.5 |
| Zinc Oxide | 40 | 39 |
| DTDS | 0 | 0.75 |
| % Trans | | |
| Precure | 1.5 | 1.5 |
| Postcure | 1.5 | 40 |
| Load in lbs Required | 85 | 109 |
| 10.8% Deflection | | |
| Mantle 1.58" Diameter | | |
| Shell 1220 | 80 | 80 |
| ZDA | 38 | 38 |

TABLE 3-continued

|  | Conventional | Example |
|---|---|---|
| Varox 231 XL | 0.42 | 0.42 |
| DBDB-60 | 0.15 | 0.15 |
| Zinc Oxide | 6 | 6 |
| Polyisoprene | 20 | 20 |
| Dual Core Properties 1.58" Diameter | | |
| Compresion | 78 | 77 |
| CoR | 0.774 | 0.789 |
| Cover Material | | |
| Na VLMI | 30 | 30 |
| Na SURLYN | 30 | 30 |
| Li SURLYN | 40 | 40 |
| Shore D | 63 | 63 |
| Ball Properties | | |
| Compression | 89 | 89 |
| CoR | 0.791 | 0.802 |
| Driver Spin | 2800 | 2850 |
| Example 5: Double Cover | | |
| Center 1.39" Diameter | | |
| Shell 1220 | 100 | 100 |
| ZDA | 24 | 24 |
| Varox 231 XL | 0.42 | 0 |
| DBDB-60 | 0.15 | 0 |
| Dicumyl Peroxide | 0 | 3 |
| Zinc Oxide | 21 | 20 |
| DTDS | 0 | 2.5 |
| % Trans | | |
| Precure | 1.5 | 1.5 |
| Postcure | 1.5 | 55 |
| Atti Compression | 48 | 15 |
| Inner Cover 1.51" Diameter | | |
| Hytrel | 60 | 60 |
| Nucrel | 20 | 20 |
| Zinc Oxide | 20 | 20 |
| Shore D | 29 | 29 |
| Cover Material | | |
| Na SURLYN | 30 | 30 |
| Li SURLYN | 40 | 40 |
| Shore D | 71 | 71 |
| Ball Properties | | |
| Compression | 89 | 70 |
| CoR | 0.793 | 0.793 |
| Driver Spin | N/A | N/A |
| Example 6: Solid 1.58" Core | | |
| Core 1.58" | | |
| Shell 1220 | 100 | 100 |
| ZDA | 26 | 29 |
| Varox 231 XL | 0.42 | 0 |
| DBDB-60 | 0.15 | 0 |
| Dicumyl Peroxide | 0 | 3 |
| Zinc Oxide | 20 | 18 |
| DTDS | 0 | 2.5 |
| % Trans | | |
| Precure | 1.5 | 1.5 |
| Postcure | 1.5 | 45 |
| Atti Compression | 80 | 18 |
| Cover Material | | |
| Na VLMI | 30 | 30 |
| Na SURLYN | 30 | 30 |
| Li SURLYN | 40 | 40 |
| Shore D | 63 | 63 |
| Ball Properties | | |
| Compression | 91 | 48 |
| CoR | 0.791 | 0.791 |
| Driver Spin | 3300 | 2900 |

Example 4

Comparison of a Conventional Dual Core Ball to Dual Core Ball Prepared According to the Invention A dual core golf ball according to the present invention was created having a solid center, an intermediate layer surrounding the solid center, and a cover disposed concentrically around the intermediate layer. The components and physical characteristics are presented in Table 3.

A solid center was constructed for the ball of the present invention and for a ball of conventional technology. The centers were both created from CARIFLEX BR1220 polybutadiene as the starting material, the only difference being replacing the VAROX 802-40KE-HP peroxide (conventional technology) with a DTDS cis-to-trans catalyst of the current invention and dicumyl peroxide. This substitution allows a portion of the polybutadiene material to be converted to the trans- configuration during the molding process. The resulting solid centers had outside diameters of approximately 1.15 inches. The polybutadiene reaction product prepared thereby had a trans- isomer content of 40 percent compared to the 1.5 percent trans- isomer of the conventional ball. Identical intermediate layers, having outside diameters of approximately 1.58 inches, were constructed around each solid center to form a core.

The compression and CoR values were measured for the two cores. The compression of the core prepared according to the current invention was measured to be 77 and the compression of the core of the conventional ball was measured to be 78. The CoR value of the conventional center was measured to be 0.774, whereas the CoR value of the core of the present invention was measured to be 0.789. Therefore, the present invention resulted in a center and a core having a higher resilience at similar compression compared to a center constructed with conventional technology.

An identical cover was added to both centers and the compression and CoR were measured again. The compression for both balls was measured to be 89, yet the CoR values were 0.791 and 0.802 for the conventional ball and the ball of the present invention, respectively. The present invention resulted in a ball having the same compression with a higher resilience (CoR) compared to a ball constructed with conventional technology.

Example 5

Comparison of a Conventional Double Cover Ball to Double Cover Ball Prepared According to the Invention A double cover golf ball according to the present invention was created having a solid center, an inner cover surrounding the solid center, and a cover disposed concentrically around the inner cover. The components and physical characteristics are presented in Table 3.

A solid center was constructed for the ball of the present invention and for a ball of conventional technology. The centers were both created from a CARIFLEX BR1220 polybutadiene starting material, the only difference being the replacing of a pair of peroxides, VAROX 231 XL and DBDB-60 (conventional technology), with a DTDS cis-to-trans catalyst of the current invention and dicumyl peroxide to facilitate cis-to-trans conversion. The resulting solid centers had outside diameters of approximately 1.39 inches. The polybutadiene reaction product of the current invention had a trans- isomer content of 55 percent compared to the 1.5 percent trans- isomer of the conventional center. Identical inner covers, having outside diameters of approximately 1.51 inches, were constructed around the solid center.

An identical cover was added to both centers and the compression and CoR values were measured. The compression for the conventional ball was measured to be 89 compared to the measured value of 70 for the ball of the current invention. The CoR values were 0.793 for both balls. The present invention resulted in a ball having the same resilience (CoR) and a significantly lower compression compared to a ball constructed with conventional technology.

Example 6

Comparison of a Conventional Solid Core Ball to Solid Core Ball Prepared According to the Invention A solid core was constructed for the ball of the present invention and for a ball of conventional technology. The components and physical characteristics are presented in Table 3.

The cores were both created from CARIFLEX BR1220 polybutadiene starting material. One core included VAROX 231 XL and DBDB-60 (conventional technology) and the other core included a DTDS cis-to-trans catalyst of the current invention and dicumyl peroxide. The resulting solid cores had outside diameters of approximately 1.58 inches. The polybutadiene reaction product of the current invention had a trans- isomer content of 45 percent compared to the 1.5 percent trans- isomer of the conventional core.

An identical cover was added to both cores and the compression and CoR values were measured. The compression for the conventional ball was measured to be 91 compared to the measured value of 48 for the ball of the current invention. The CoR values were 0.791 for both balls. The present invention resulted in a ball having the same resilience (CoR) and a significantly lower compression compared to a ball constructed with conventional technology.

Example 7–10

Comparison of Conventional Golf Balls With Those Prepared According to the Invention A polybutadiene reaction product according to the invention was prepared according to the following recipe:

| REACTION PRODUCT | Example 7 (Prior Art) | Example 8 (Prior Art) | Example 9 | Example 10 |
|---|---|---|---|---|
| polybutadiene rubber (CARIFLEX BR1220) | 100 phr | 100 phr | 100 phr | 100 phr |
| Zinc Oxide (ZnO) | 26.6 phr | 2.67 phr | 26.6 phr | 26.6 phr |
| Barium Sulfate (BaSO$_4$) | — | 31 phr | — | — |
| zinc diacrylate | 20 phr | 22.3 phr | 20 phr | 20 phr |
| dicumyl peroxide | 2 phr | — | 2 phr | 2 phr |
| VAROX 802 40KE-HP[a] | — | 0.89 phr | — | — |
| Polymeric sulfur | 0 phr | 0 phr | 0.25 phr | 0 phr |
| Elemental sulfur | 0 phr | 0 phr | 0 phr | 0.25 phr |
| Pre-cure trans-polybutadiene content GOLF BALL CORE | 1.5% | 1.5% | 1.5% | 1.5% |
| Post-cure-trans-polybutadiene content in reaction product | 1.5% | 1.5% | 12% | 12% |
| Atti Compression | 53 | 23 | 26 | 21 |
| Coeff. of Restitution ("COR") | N/A[b] | 0.72 | 0.77 | 0.76 |

[a] A di-(2-t-butylisopropylperoxy)-benzene peroxide commercially available from R. T. Vanderbilt of Norwalk, CT.
[b] The core of Example 7 was sufficiently rigid to crack during testing of the coefficient of restitution.

These constituents were mixed and molded, thereby converting a percentage of cis- to a trans- conformation, in a solid sphere sized like the core of a golf ball. The compression and coefficient were measured for these cores, each having a 1.580 inch diameter. Examples 9–10 illustrate the significant conversion of cis-polybutadiene to trans-polybutadiene when a sulfur cis-to-trans catalyst is present according to the invention compared to the lack of conversion in Examples 7–8 when no sulfur catalyst is present. Moreover, Examples 9–10 illustrate the improved coefficient of restitution with no significant change in compression that can be achieved with golf balls including the reaction product according to the invention.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a material formed from the conversion reaction of an amount of polybutadiene, a free radical source, and a cis-to-trans catalyst comprising at least one Group VIA component, which reaction occurs at a sufficient temperature to form a polybutadiene reaction product which comprises an amount of trans-polybutadiene greater than the amount of trans-polybutadiene present before the conversion reaction, wherein the reaction product has a first dynamic stiffness measured at −50° C. that is less than about 130 percent of a second dynamic stiffness measured at 0° C., and wherein the at least one Group VIA component comprises selenium, tellurium, or a combination thereof.

2. The golf ball of claim 1, wherein the golf ball comprises a cover having at least one of a dimple coverage of greater than about 60 percent, a hardness from about 35 to 80 Shore D, or a flexural modulus of greater than about 500 psi, and wherein the golf ball has at least one of a compression from about 50 to 120 or a coefficient of restitution of greater than about 0.7.

3. The golf ball of claim 1, wherein the first and second dynamic stiffnesses are measured approximately 5 mm from an edge of the golf ball or at the center of the golf ball.

4. The golf ball of claim 1, wherein the reaction product comprises a portion of a golf ball core which has a midpoint having a first amount of trans-polybutadiene and a surface having a second amount of trans-polybutadiene, wherein the first amount is at least about 6 percent less than the second amount.

5. The golf ball of claim 1, wherein the conversion reaction further comprises at least one metallic salt of an unsaturated fatty acid or monocarboxylic acid.

6. The golf ball of claim 5, wherein at least one metallic salt is selected from the group consisting of zinc acrylate, zinc diacrylate, zinc methacrylate, zinc dimethacrylate, and mixtures thereof.

7. The golf ball of claim 1, wherein the cis-to-trans catalyst is present in an amount from about 0.01 to 25 parts per hundred of polybutadiene.

8. The golf ball of claim 7, wherein the cis-to-trans catalyst is present in an amount from about 0.01 to 1 parts per hundred of polybutadiene.

9. The golf ball of claim 1, wherein the cis-to-trans catalyst further comprises at least one of an inorganic sulfur compound, an organosulfur compound, an aromatic organometallic compound, a metal-organosulfur compound, or an aromatic organic compound.

10. The golf ball of claim 1, wherein the polybutadiene reaction product comprises less than about 7 percent vinyl isomer content based on the total polybutadiene.

11. The golf ball of claim 10, wherein the polybutadiene reaction product comprises less than about 4 percent vinyl isomer.

12. The golf ball of claim 11, wherein the polybutadiene reaction product comprises less than about 2 percent vinyl isomer.

13. The golf ball of claim 1, further comprising a vulcanization accelerator.

14. The golf ball of claim 13, wherein the vulcanization accelerator comprises at least one of sulfenamide, thiazole, dithiocarbamate, thiuram, xanthate, thiadiazine, thiourea, guanadine, or aldehyde-amine.

15. The golf ball of claim 13, wherein the accelerator is present in an amount from about 0.05 phr to 2 phr.

16. The golf ball of claim 15, wherein the accelerator is present in an amount from about 0.1 phr to 1 phr.

17. The golf ball of claim 1, wherein the golf ball comprises a one-piece golf ball.

18. The golf ball of claim 1, wherein the golf ball comprises a core and a cover disposed concentrically about the core and the reaction product is disposed in at least a portion of the core.

19. The golf ball of claim 1, wherein the golf ball comprises:

a core comprising a center and at least one intermediate layer; and a cover disposed concentrically about the core, wherein the reaction product is disposed in a portion of the core.

20. The golf ball of claim 19, wherein the portion of the core having the reaction product is the center.

21. The golf ball of claim 19, wherein a portion of the center comprises a fluid.

22. The golf ball of claim 19 wherein the at least one intermediate layer comprises a wound layer of tensioned elastomeric material.

23. The golf ball of claim 22, wherein the tensioned elastomeric material comprises the reaction product.

24. The golf ball of claim 1, further comprising a density-modifying filler.

25. A method for forming a golf ball which comprises:

combining (a) a cis-to-trans catalyst comprising at least one Group VIA component wherein the at least one Group VIA component comprises selenium, tellurium, or a combination thereof; (b) a free radical source; and (c) a first resilient polymer component comprising a cis-polybutadiene component present in an amount greater than about 70 percent of the total polymer component;

converting a portion of the first resilient polymer component to a second resilient polymer component in about 5 to 18 minutes at a sufficient temperature to convert at least a portion of the cis-polybutadiene component to a trans-polybutadiene component and wherein the polybutadiene in the second resilient polymer component is at least about 10 percent trans-polybutadiene and less than about 7 percent vinyl-polybutadiene; and forming the second resilient polymer component into at least a portion of the golf ball.

26. The method of claim 25, wherein the portion of the second resilient polymer component is formed into a solid sphere.

27. The method of claim 26, which further comprises forming at least one layer over the solid sphere.

28. The method of claim 25, which further comprises forming the portion of the second resilient polymer component into at least one layer disposed concentrically about a sphere.

29. The method of claim 25, which further comprises forming the portion of the second resilient polymer component into a cover disposed concentrically about a sphere.

30. The method of claim 25, wherein the polybutadiene component comprises a cis-polybutadiene present in an amount of at least about 80 percent of the total first resilient polymer component.

31. The method of claim 25, wherein the combining further comprises a density-modifying filler.

32. The method of claim 25, wherein the forming comprises forming a sphere having a midpoint having a first amount of trans-polybutadiene and a surface having a second amount of trans-polybutadiene, wherein the first amount is at least about 6 percent less than the second amount.

33. The method of claim 25, wherein the second amount of trans-polybutadiene component is selected to comprise a vinyl polybutadiene component present in an amount of less than about 4 percent of the total resilient polymer component.

34. The method of claim 25, wherein the forming comprises:

a single-step compression molding of the first resilient polymer component to convert the first resilient polymer component to the second resilient polymer in about 8 to 15minutes; and forming the second resilient polymer component into a solid sphere.

35. The method of claim 34, wherein the converting and forming are substantially simultaneous.

36. The method of claim 25, wherein the cis-to-trans catalyst is present in an amount from about 0.01 to 25 parts per hundred of the total resilient polymer component.

37. The method of claim 36, wherein the cis-to-trans catalyst is present in an amount from about 0.01 to 1 parts per hundred of the total resilient polymer component.

38. The method of claim 37, wherein the cis-to-trans catalyst is present in an amount from about 0.05 to 0.5 parts per hundred of the total resilient polymer component.

39. The method of claim 25, wherein the cis-to-trans catalyst is selected to further comprise at least one of an inorganic sulfide, organosulfur compound, an aromatic organometallic compound, a metal-organosulfur compound, or an aromatic organic compound.

40. The method of claim 25, which further comprises providing an accelerator in an amount sufficient to facilitate cis-to-trans conversion.

41. The method of claim 40, wherein the accelerator is selected to comprise at least one of sulfenamide, thiazole, dithiocarbamate, thiuram, xanthate, thiadiazine, thiourea, guanadine, or aldehyde-amine.

42. The method of claim 40, wherein the accelerator is provided in an amount from about 0.05 to 2 phr of the total resilient polymer component.

43. The method of claim 42, wherein the accelerator is provided in an amount from about 0.1 to 1 phr of the total resilient polymer component.

44. The method of claim 28 wherein a portion of the sphere comprises a fluid.

45. The method of claim 28 wherein a tensioned elastomeric material is wound about the sphere.

46. The method of claim 45, wherein the tensioned elastomeric material comprises the reaction product.

47. The method of claim 25, wherein the combining step further comprises (d) at least one metallic salt of an unsaturated fatty acid or monocarboxylic acid selected from the group consisting of zinc acrylate, zinc diacrylate, zinc methacrylate, zinc dimethacrylate, and mixtures thereof.

48. A golf ball prepared by a process which comprises:
combining (a) at least one of a cis-to-trans catalyst comprising at least one Group VIA component, wherein the at least one Group VIA component comprises selenium, tellurium, or a combination thereof, (b) a free radical source; and (c) a first resilient polymer component comprising a cis-polybutadiene component present in an amount greater than about 70 percent of the resilient polymer component;
converting a portion of the first resilient polymer component to a second resilient polymer component in about 5 to 18 minutes, wherein at least a portion of the cis-isomer content is converted to a trans-isomer content and wherein the polybutadiene in the second resilient polymer component is at least about 10 percent trans-polybutadiene and less than about 7 percent vinyl-polybutadiene; and
forming the second resilient polymer component into at least a portion of the golf ball.

49. The golf ball of claim 48, wherein the combining step further comprises (d) at least one metallic salt of an unsaturated fatty acid or monocarboxylic acid selected from the group consisting of zinc acrylate, zinc diacrylate, zinc methacrylate, zinc dimethacrylate, and mixtures thereof.

50. A golf ball comprising a material formed from the conversion reaction of a sufficient amount of polybutadiene, a free radical source, and a cis-to-trans catalyst comprising at least one Group VIA component, which reaction occurs at a sufficient temperature to form a polybutadiene reaction product which comprises;
an amount of trans-polybutadiene greater than the amount of trans-polybutadiene present before the conversion reaction; and
a cis-to-trans catalyst comprising the at least one Group VIA element, wherein the reaction product comprises a sphere which has a midpoint having a first hardness and a surface having a second hardness at least 10 percent greater than the first hardness,
wherein the at least one Group VIA component comprises selenium, tellurium, or a combination thereof.

51. The golf ball of claim 50, wherein the conversion reaction further comprises at least one metallic salt of an unsaturated fatty acid or monocarboxylic acid selected from the group consisting of zinc acrylate, zinc diacrylate, zinc methacrylate, zinc dimethacrylate, and mixtures thereof.

52. A method for forming a golf ball which comprises:
combining (a) a cis-to-trans catalyst comprising at least one Group VIA component, wherein the at least one Group VIA component comprises selenium, tellurium, or a combination thereof; (b) a free radical source; and (c) a first resilient polymer component comprising a cis-polybutadiene component present in an amount greater than about 70 percent of the total polymer component;
converting a portion of the first resilient polymer component to a second resilient polymer component in about 5 to 18 minutes at a sufficient temperature to convert at least a portion of the cis-polybutadiene component to a trans-polybutadiene component and wherein the polybutadiene in the second resilient polymer component is at least about 10 percent trans-polybutadiene and less than about 7 percent vinyl-polybutadiene; and
forming the second resilient polymer component into at least a portion of the golf ball, wherein the second resilient component comprises a sphere which has a midpoint having a first hardness and a surge having a second hardness such that the second hardness differs from thee first hardness by greater than 10 percent of the first hardness.

53. The method of claim 52, wherein the combining step further comprises (d) at least one metallic salt of an unsaturated fatty acid or monocarboxylic acid selected from the group consisting of zinc acrylate, zinc diacrylate, zinc methacrylate, zinc dimethacrylate, and mixtures thereof.

54. A method for forming a golf ball which comprises:
combining (a) a cis-to-tans catalyst comprising at least one Group VIA component, wherein the at least one Group VIA component comprises selenium, tellurium, or a combination thereof; (b) a free radical source; and (c) a first resilient polymer component comprising a cis-polybutadiene component present in an amount greater than about 70 percent of the total polymer component;
converting a portion of the first resilient polymer component to a second resilient polymer component in about 5 to 18 minutes at a sufficient temperature to convert at least a portion of the cis-polybutadiene component to a trans-polybutadiene component and wherein the polybutadiene in the second resilient polymer component is at least about 10 percent trans-polybutadiene and less than about 7 percent vinyl-polybutadiene; and
forming the second resilient polymer component into at least a portion of the golf ball, wherein the second resilient component has a first dynamic stiffness measured at −50° C. that is less than about 130 percent of a second dynamic stiffness measured at 0° C.

55. The method of claim 54, wherein the combining step further comprises (d) at least one metallic salt of an unsaturated fatty acid or monocarboxylic acid selected from the group consisting of zinc acrylate, zinc diacrylate, zinc methacrylate, zinc dimethacrylate, and mixtures thereof.

56. A golf ball comprising a material formed from the conversion reaction of an amount of polybutadiene, a free radical source, at least one metallic salt of an unsaturated fatty acid or monocarboxylic acid, a vulcanization accelerator, and a cis-to-trans catalyst comprising at least one Group VIA component, which reaction occurs at a sufficient temperature to form a polybutadiene reaction product which comprises an amount of trans-polybutadiene greater than the amount of trans-polybutadiene present before the conversion reaction, wherein the reaction product has a first dynamic stiffness measured at −50° C. that is less than about 130 percent of a second dynamic stiffness measured at 0° C., wherein the at least one Group VIA component comprises selenium, tellurium, or a combination thereof.

* * * * *